(12) United States Patent
Schütt et al.

(10) Patent No.: US 8,882,485 B2
(45) Date of Patent: Nov. 11, 2014

(54) SPINNERET BUNDLE

(71) Applicant: Oerlikon Textile GmbH & Co. KG, Remscheid (DE)

(72) Inventors: Günter Schütt, Neumünster (DE); Volker Birkholz, Neumünster (DE); Nicola Efftunge-Reichau, Kiel (DE); Sebastian Kohl, Neumünster (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 0 days.

(21) Appl. No.: 13/936,492

(22) Filed: Jul. 8, 2013

(65) Prior Publication Data

US 2013/0295208 A1    Nov. 7, 2013

Related U.S. Application Data

(63) Continuation-in-part of application No. PCT/EP2011/071012, filed on Nov. 25, 2011.

(30) Foreign Application Priority Data

Jan. 12, 2011   (DE) .................... 10 2011 008 356

(51) Int. Cl.
| | |
|---|---|
| *D01D 5/12* | (2006.01) |
| *D01D 4/02* | (2006.01) |
| *D01D 4/06* | (2006.01) |
| *D01D 5/098* | (2006.01) |
| *B29C 47/30* | (2006.01) |
| *B29C 47/70* | (2006.01) |
| *B29C 47/00* | (2006.01) |

(52) U.S. Cl.
CPC .. *D01D 4/02* (2013.01); *D01D 4/06* (2013.01); *D01D 5/0985* (2013.01); *B29C 47/30* (2013.01); *B29C 47/705* (2013.01); *B29C 47/0014* (2013.01)
USPC ........ 425/72.2; 425/198; 425/382.2; 425/464

(58) Field of Classification Search
USPC .................. 425/66, 72.2, 198, 382.2, 464
See application file for complete search history.

(56) References Cited

U.S. PATENT DOCUMENTS

| | | | | |
|---|---|---|---|---|
| 3,888,963 A | * | 6/1975 | Orso et al. | ............... 264/211.11 |
| 4,150,932 A | * | 4/1979 | Moghe | ................... 425/197 |

(Continued)

FOREIGN PATENT DOCUMENTS

| | | |
|---|---|---|
| DE | 10 2006 017 212 | 4/2006 |
| DE | 10 2007 032 107 | 1/2008 |

(Continued)

OTHER PUBLICATIONS

PCT/EP2011/071012 International Search Report dated Feb. 20, 2012 (6 pages including 3 page English translation).

(Continued)

*Primary Examiner* — Yogendra Gupta
*Assistant Examiner* — Joseph Leyson
(74) *Attorney, Agent, or Firm* — Brinks Gilson & Lione; G. Peter Nichols

(57) ABSTRACT

A spinneret bundle for producing fibers from a polymer melt includes an elongated nozzle plate that has a feed channel on an upper face and at least one row of nozzle bores that are arranged next to one another on a lower face. A distributing plate lies on the upper face of the nozzle plate and has a distributing chamber that faces the feed channel and a melt inlet that is connected to the distributing chamber. A perforated plate with a plurality of through-bores is provided between the distributing chamber of the distributing plate and the feed channel of the nozzle plate in order to achieve a redistribution and uniformity of the melt when the melt is introduced into the feed channel.

14 Claims, 8 Drawing Sheets

(56) References Cited

U.S. PATENT DOCUMENTS

| | | | |
|---|---|---|---|
| 5,811,048 A | * | 9/1998 | Dunn et al. ............... 264/177.11 |
| 6,120,276 A | * | 9/2000 | Balk ........................... 425/131.5 |
| 6,474,967 B1 | | 11/2002 | Haynes et al. |
| 2007/0134478 A1 | | 6/2007 | Haberer et al. |
| 2009/0104301 A1 | | 4/2009 | Birkholz et al. |

FOREIGN PATENT DOCUMENTS

| | | |
|---|---|---|
| WO | WO 01/88234 | 11/2001 |
| WO | WO 2005/061773 | 7/2005 |
| WO | WO 2007/131714 | 11/2007 |

OTHER PUBLICATIONS

PCT/EP2011/071012 International Preliminary Report on Patentability dated Jul. 16, 2013 (6 pages).

* cited by examiner

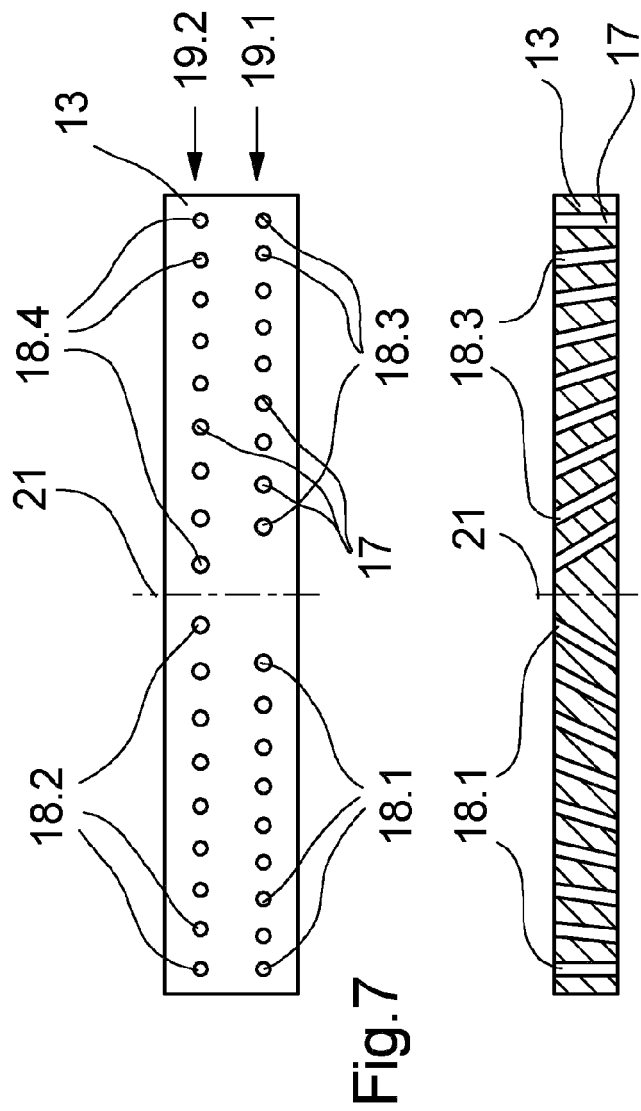

SPINNERET BUNDLE

This application is a continuation-in-part of and claims the benefit of priority from PCT application PCT/EP2011/071012 filed Nov. 25, 2011; and German Patent Application DE 10 2011 008 356.1 filed Jan. 12, 2011, the disclosure of each is hereby incorporated by reference in its entirety.

BACKGROUND

The invention relates to a spinneret bundle for producing fibers from its polymer melt.

A generic spinneret bundle is described DE 10 2006 017 212. This generic spinneret bundle is used for producing nonwovens, in which the fibers extruded through an array of a plurality of nozzle bores are extracted by means of airflow. In this respect, a nozzle package can be used for melt blowing a plurality of fibers. The polymer melt is supplied through a melt inlet provided on an upper distributing plate of the nozzle package. The melt inlet opens into a distributing chamber which, in turn, opens into a feed channel of a nozzle plate. The distributing chamber within the distributing plate and the feed channel within the nozzle plate extend along a row of nozzle bores that are connected with the feed channel. A filter element and a perforated plate are provided between the distributing chamber and the feed channel. Furthermore, a displacer is provided in the feed channel to achieve the lowest possible melt residence times within the nozzle package, thus generating relatively small flow areas and consequently higher flow rates.

However, such displacers generally have the disadvantage that, depending on their shape, they form more or less distinctive dead zones, which do not receive continuous melt flow. As a result, it is not possible to adequately eliminate the different melt residence times. A further disadvantage that may occur, especially with polymer melts, is that higher shearing energy is generated by the displacer due to reduced flow rates, which results in a temperature increase and a change of the viscosity of the melt. Such occurrences can be local so that irregularities could occur through the nozzle bores over the length of the nozzle package when extruding melt.

To achieve a uniform distribution of polymer melt over an extended length of the nozzle package, WO 2007/131714 discloses a spinneret bundle in which multiple distributing chambers are arranged one next to another within the distributing plate and which are connected with the feed channel in the nozzle plate through a perforated plate having a plurality of hole groups. At the same time, each distributing chamber is associated with one of the hole groups on the perforated plate, wherein the distributing chambers are supplied with a polymer melt via separate melt inlets.

Consequently, these known nozzle packages are suitable to be used in the production of nonwovens with large production widths of >5 m. Because of the plurality of melt inlets and the plurality of spinning pumps required for that purpose, such a nozzle package is too costly for small production widths.

SUMMARY

It is an object of the invention to provide a spinneret bundle for producing fibers from a polymer melt in which it is possible to achieve a consistent melt flow and melt distribution with the use of simple means.

Furthermore, the invention has an object of producing uniform fibers and fiber placements in a production width with nozzle bores, which are arranged in a row.

The present invention is based on the recognition that in a conventional distribution with coat hanger shaped distributing chambers, the polymer melt in the central portion of the nozzle package exhibit nonwoven technical differences, which basically result from temperature-related viscosity differences, in comparison to the polymer melts located in the marginal regions. For example, it has been observed that the fiber layers produced in conventional nozzle packages have the tendency to show higher surface weight in the central portion. In particular, this effect can be observed when processing PBT polymer.

To compensate for the effects occurring in the distributing chamber, a perforated plate arranged between the distributing chamber and the feed channel of the nozzle plate is used in order to achieve uniformity of the melt within the feed channel. According to the invention, the through-bores in the perforated plate are divided into multiple bore groups, wherein the through-bores of at least two of the bore groups in the perforated plate have inclination angles that are different within the perforated plate with respect to perpendicular bisectors in such a way that the through-bores at least partly cross one another at a distance from one another within the perforated plate. As a result, the melt directed from the distributing chamber into the feed channel is distributed locally via the through-bores within the nozzle package. This results in a more uniform distribution of the melt within the feed channel so that each of the nozzle bores connected with the feed channel basically provide the same melt flow rate.

In channel-shaped distributing chambers and feed channels, one particular further embodiment of the invention that has proved to be especially practical is where the inclined through-bores within the perforated plate are formed by two adjacent rows of holes that run parallel to the row of nozzle bores. This allows for local distribution in the longitudinal direction of the feed channel or transverse to the feed channel.

In this connection, it is of special advantage when the further embodiment of the invention involves a design of the spinneret bundle in which the inclined through-bores within the perforated plate are arranged at two adjacent distribution levels, which extend parallel to the rows of nozzle bores. This makes it possible to redistribute the melt in a longitudinal direction of the feed channel when it is transferred from the distributing channel to the feed channel. Depending on the inclination of the through-bores of the bore group, the melt can be directed from one end of the nozzle package to a central portion of the nozzle package or from a central portion of the nozzle package to one end of the nozzle package.

In particular, the further embodiment of the invention can be used for a coat hanger shaped distributing chamber in which the perforated plate has two rows of holes with multiple bore groups, wherein the through-bores of the bore groups are designed in mirror-symmetry with respect to a central region of the perforated plate. As a result, the melt situated in the distributing chamber in the central portion of the nozzle package can be guided out of each central portion of the nozzle package by means of the through-bores.

The uniform distribution of the melt can also be affected by the arrangement of the through-bores. For example, it is proposed to provide each of the through-bores of one of the bore groups within the perforated plate with equal inclination angles.

However, it is also possible to provide the through-bores of one of the bore groups within the perforated plate with respectively different angles of inclination.

For the angles of inclination of the through bores, an angular range of between 0° and 60° and/or 0° and −60° has proved to be especially advantageous.

Advantageously, the redistribution of the melt by means of the through-bores of the perforated plate according to the present invention can also be used for distributing plates designed with a plurality of adjacent distributing chambers. To this end, the distributing chambers can be associated with one of multiple perforated plates with a plurality of bore groups. In this regard, it is essential that at least two bore groups are associated with each distributing chamber within the perforated plate.

For the structural implementation, in particular, it is especially advantageous to use a further embodiment of the spinneret bundle in which the perforated plate is held in a recess that is arranged symmetrically with respect to the feed channel on the upper face of the nozzle plate.

Furthermore, to be able to extract the fibers produced by the nozzle bores by means of an air flow, a diffuser plate is arranged on the lower face of the nozzle plate. And, between the nozzle plate and the diffuser plate, two opposite air nozzle channels are provided, which have discharge outlets associated with the nozzle bores. In this connection, the air can be supplied to the nozzle package by means of separate air passages.

The invention is described in more detail by means of several embodiments of the spinneret bundle according to the present invention and with reference to the included figures.

BRIEF DESCRIPTION OF THE DRAWINGS

The device according to the invention shall be explained in greater detail below based on a few embodiments, with reference to the attached figures.

FIG. 7 schematically shows a top view of a further embodiment of a perforated plate of the spinneret bundle shown in FIG. 2.

FIG. 8 schematically shows a longitudinal sectional view of the perforated plate of FIG. 7.

FIG. 9 schematically shows a longitudinal sectional view of the perforated plate of FIG. 7.

DETAILED DESCRIPTION

Figure 1:
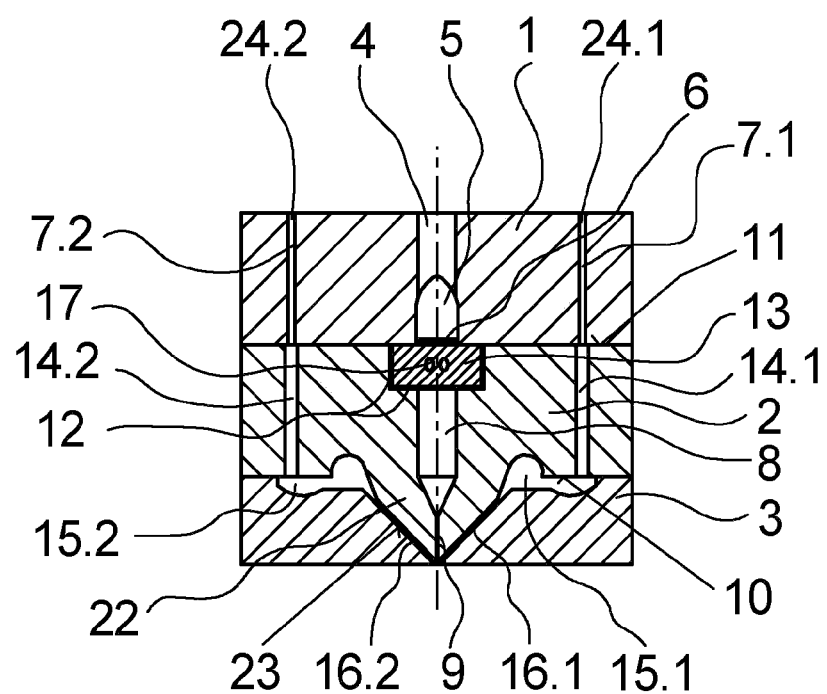
FIG. 1 schematically shows a cross-sectional view of a first embodiment of the invention-based spinneret bundle.
Figure 2:
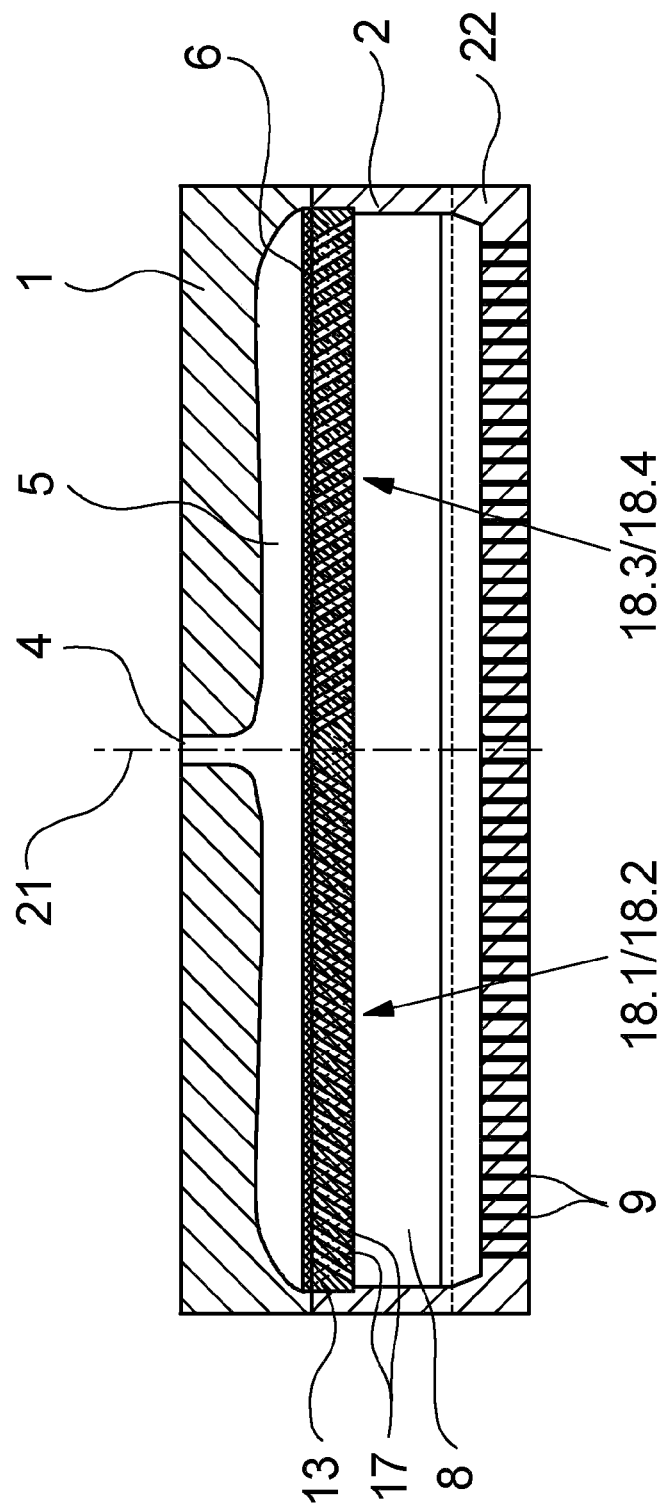
FIG. 2 schematically shows a longitudinal view of the embodiment shown in FIG. 1.

FIGS. 1 and 2 show schematically several views of a first embodiment of the spinneret bundle according to the present invention. FIG. 1 shows the embodiment schematically in a cross-sectional view, and in FIG. 2 the spinneret bundle is shown in a longitudinal view. If no specific reference is made to any one of the figures, the following description applies to both figures.

The spinneret bundle includes a nozzle plate 2, which has a distributing plate 1 on an upper face 11 and which is connected with a diffuser plate 3 on a lower face 10. The distributing plate 1 and the diffuser plate 3 are connected in a pressure-tight manner with the nozzle plate 2 and with one another, for example, by means of a plurality of screws (not described in detail).

Usually, the plates 1, 2 and 3 are arranged in a heated spinning beam, which has corresponding ports for receiving the distributing plate 1.

The distributing plate 1 comprises a melt inlet 4 that is located on the side opposite of the nozzle plate 2. The melt inlet 4 opens into the distributing chamber 5 within the distributing plate 1.

FIG. 2 shows that the distributing chamber 5 in the distributing plate is shaped like a coat hanger and extends in a longitudinal direction of the rectangular spinneret bundle. The distributing chamber 5 is open on the side of the distributing plate 1 facing the nozzle plate 2 and borders a filter element 6.

FIGS. 1 and 2 show that the filter element 6 is located on a perforated plate 13 which has been inserted in a recess 12 on the upper face 11 of the nozzle plate 2. The recess 12 is formed in symmetry to a feed channel 8, which opens on one end toward the recess 12 and which has a taper on the opposite end which comprises a plurality of nozzle bores 9. The nozzle bores 9 are formed in a row and extend in a longitudinal direction of the nozzle plate 2. The nozzle bores 9 and the end of the feed channel 8 are arranged on a protruding central web 22 of the nozzle plate 2. FIG. 1 shows that the web 22 together with a recess 23 inserted in a diffuser plate 3 form two opposite air nozzle channels 16.1 and 16.2, which have discharge outlets that are associated with the outlet of the nozzle bores 9. Each of the air nozzle channels 16.1 and 16.2 open into an air chamber 15.1 and 15.2, which is located between the nozzle plate 2 and the diffuser plate 3. The air chambers 15.1 and 15.2 are connected with multiple air passages 7.1 and 7.2 in the distributing plate 1 via multiple air passages 14.1 and 14.2 in the nozzle plate 2. Each of the air passages 7.1 and 7.2 in the distributing plate 1 forms a compressed air inlet 24.1 and 24.2 on the distributing plate 1.

Figure 3:
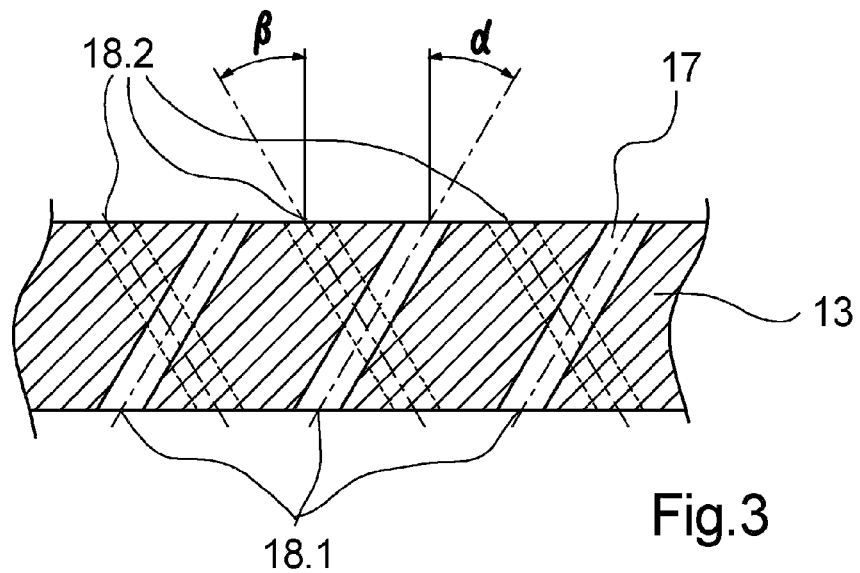
FIG. 3 schematically shows a section of a longitudinal view of the perforated plate shown in the embodiment according to FIG. 2.
Figure 4:
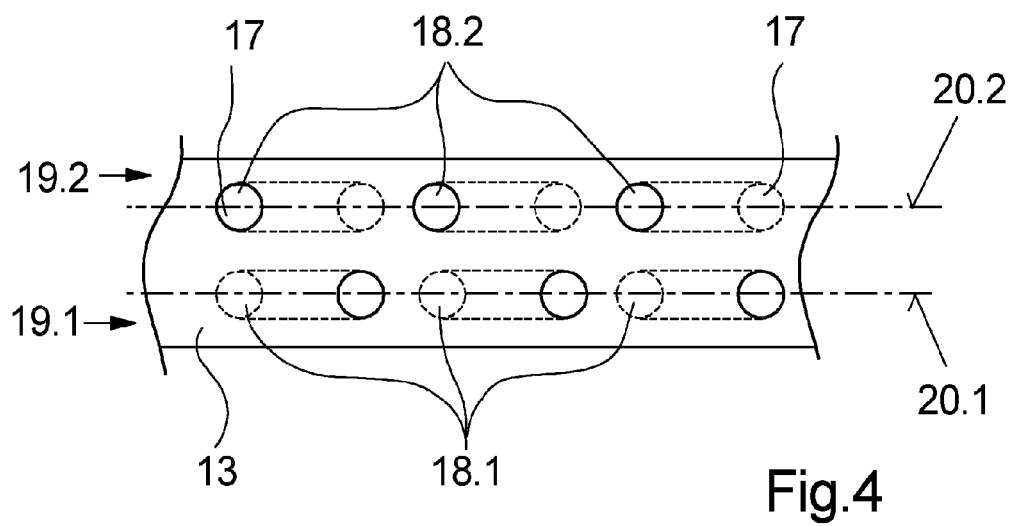
FIG. 4 schematically shows a section of a top view of the perforated plate shown in FIG. 3.

FIGS. 1 and 2 show that the distributing chamber 5 of the distributing plate 1 is connected with the feed channel 8 in the nozzle plate 2 via the filter element 6 and the perforated plate 13. For this purpose, the perforated plate 13 comprises a plurality of through-bores 17. Additional reference is made to FIGS. 3 and 4 with regard to the formation and arrangement of the through-bores 17 in the perforated plate 13. FIG. 3 shows a partial view of a longitudinal cut of the perforated plate 13, and FIG. 4 shows a partial view of the top view of the perforated plate 13. The perforated plate 13 comprises multiple bore groups with multiple through-bores 17, respectively. FIGS. 3 and 4 show two bore groups 18.1 and 18.2. The through-bores 17 of bore group 18.1 are arranged in a first row of holes 19.1, and the through-bores 17 of bore group 18.2 are arranged in a second row of holes 19.2. The longitudinal view of the perforated plate 13 according to FIG. 3 shows the through-bores 17 of the first bore group 18.1. The through-bores 17 of the second bore group 18.2 are represented by a dotted line in FIG. 3.

FIG. 3 shows that the through-bores 17 of bore group 18.1 have an inclination angle within the perforated plate 13 with respect to a perpendicular bisector. The inclination angle is identified by the reference α. The spaced through-bores 17 of the second bore group 18.2 also have an inclination angle within the perforated plate with respect to a perpendicular bisector. The inclination angle is identified by the reference β.

The inclination angles α and β have different directions with respect to the perpendicular bisector, so that the through-bores 17 of the two bore groups 18.1 and 18.2 cross one another at a distance from one another within the perforated plate. In this embodiment, the inclination angles α and β have the same value, which means that α=β. In general, the inclination angles α and β can have different values.

In this embodiment, all through-bores 17 within bore group 18.1 have the same inclination angle α. And the through-bores 17 of the second bore group 18.2 also have the same inclination angle β.

In particular, FIG. 4 shows that the inclined through-bores 17 of bore group 18.1 are located in a first distribution level 20.1, and the inclined through-bores 17 of the second bore group 18.2 are located in a second distribution level 20.2. The arrow in FIG. 4 indicates that the melt passing through the through-bores 17 in the distribution level 20.1 is distributed to the left. The inclined through-bores 17 in the distribution level 20.2, on the other hand, result in a melt distribution to the right. Consequently, the melt passing through the perforated plate 13 can be redistributed in such a way that melt supplied in the central region of the distributing chamber 5 is moved to the outside in the feed channel 8 and, conversely, melt supplied at the ends of the distributing chamber 5 is moved to the central region of the feed channel 8.

FIG. 2 shows that the perforated plate 13 comprises a total of four bore groups 18.1, 18.2, 18.3 and 18.4. In the longitudinal cut, only the through-bores 18.1 and 18.3 are shown. The through-bores 17 of the bore group 18.1 and 18.3 are designed in mirror symmetry with respect to a central region of the plate 21. In this respect, the through-bores 17 of bore group 18.3 have an inclination angle β such as has been described with regard to bore group 18.2. Because of the fact that the four bore groups within the perforated plate 13 are designed in mirror symmetry, the bore groups 18.1 and 18.4, as well as the bore groups 18.2 and 18.3 have the same design.

The arrangement and design of the through-bores 17 in the perforated plate 13 result in a distribution of the melt when the melt is transferred from the distributing chamber 5 to the feed channel 8. As a result, the melt supplied by the inclined through-bores 17 in the central region of the distributing chamber 5 is distributed in longitudinal direction. This produces transverse flows within the feed channel 8, which result in a more uniform distribution of the melt.

Figure 5:
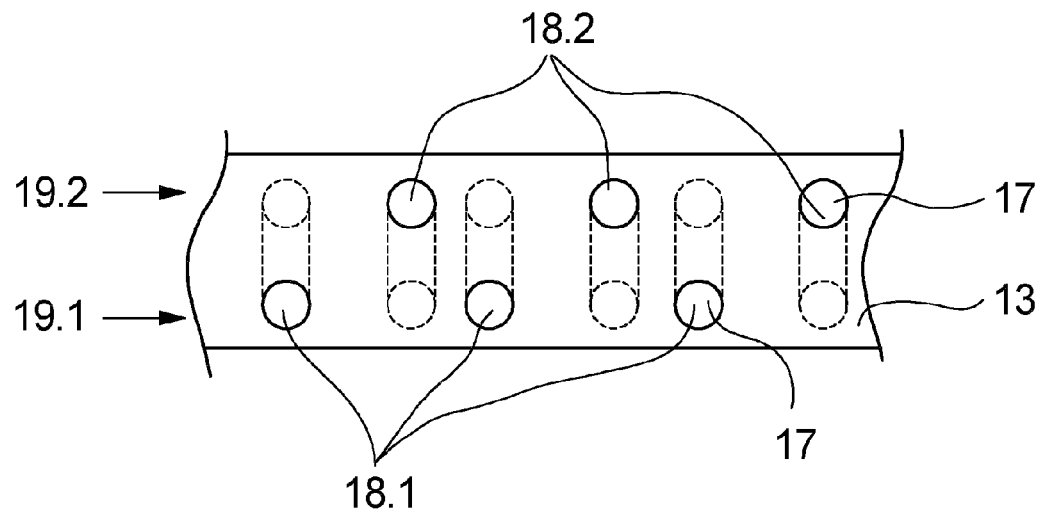
FIG. 5 schematically shows a section of a top view of an alternative embodiment of the perforated plate shown in FIG. 2.
Figure 6:
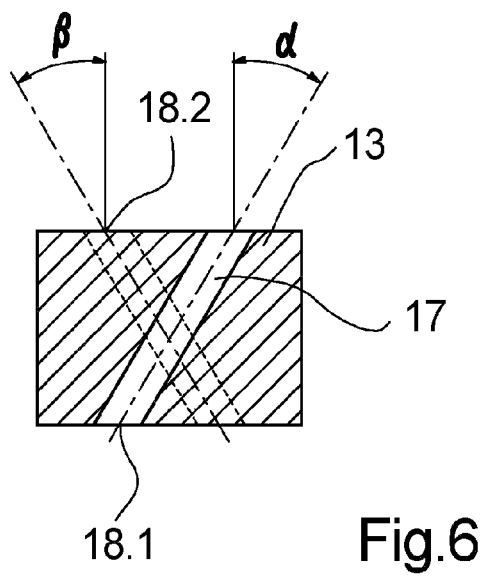
FIG. 6 schematically shows a cross-sectional view of the perforated plate shown in FIG. 5.

However, depending on the design and inclination of the through-bore 17 in the perforated plate 13, it is also possible to distribute the melt within the feed channel 8 of the nozzle plate 2 in any other manner. For example, FIGS. 5 and 6 show an embodiment of a perforated plate 13 that could be used in the spinneret bundle in the embodiment according to FIG. 1. In the embodiment of the perforated plate 13 shown in FIGS. 5 and 6, the through-bores 17 are divided in two bore groups 18.1 and 18.2. The bore group 18.1 forms a first row of holes 19.1, and the bore group 18.2 forms a second row of holes 19.2. In this embodiment, the through-bores 17 of both bore groups 18.1 and 18.2 are not inclined in longitudinal direction but are inclined transverse to the perforated plate 13. For example, the cross-sectional view in FIG. 6 shows that the through-bores 17 of bore group 18.1 penetrate the perforated plate with an inclination angle α, and that the through-bores of bore group 18.2 have an inclination angle β. Also in this case, the inclination angles can have the same values, but with respect to a perpendicular bisector in different directions. Here also applies α=β.

Consequently, when using the perforated plate shown in FIGS. 5 and 6 for the embodiment according to FIGS. 1 and 2, the melt discharged from the distributing chamber 5 would be redistributed between the longitudinal sides of the feed channel 8.

FIGS. 7, 8, and 9 show a further embodiment of a perforated plate that could be used for the embodiment of the spinneret bundle according to FIGS. 1 and 2. FIGS. 7, 8 and 9 show different views of the perforated plate 13. FIG. 7 shows a top view of the perforated plate, FIG. 8 shows a longitudinal view of the row of holes 19.1, and FIG. 9 shows a longitudinal view of the row of holes 19.2. FIGS. 7, 8 and 9 show a respective partial view of the perforated plate 13 in the central region of the plate 21.

FIG. 7 indicates that the perforated plate 13 comprises a plurality of through-bores 17, which are divided into a total of four bore groups 18.1 to 18.4. The bore groups 18.1 and 18.3, as well as 18.2 and 18.4 form a row of holes 19.1 and 19.2, respectively. The bore groups 18.1 and 18.2 are designed in mirror symmetry with respect to the bore groups 18.3 and 18.4.

FIG. 8 shows a longitudinal view of the bore group 18.1 and 18.3. The through-bores 17 of the bore groups 18.1 and 18.3 comprise a different inclination angle within the respective bore group. Starting from the central region of the plate 21, the inclination angle decreases toward the ends of the plate. The through-bores 17 do not have an inclination angle toward the ends of the plate and penetrate the perforated plate basically in a vertical direction. Consequently, the through-bores 17 of the bore groups 18.1 and 18.3 are especially suitable to move a polymer melt supplied in the central region of the plate away from the central region of the plate 21 on the discharge side of the through-bores.

FIG. 9 shows a longitudinal view of the through-bores 17 of bore groups 18.2 and 18.4, which indicates how to transfer in the same manner melt supplied from the sides to the central region. The bore groups 18.2 and 18.3 are also designed in mirror symmetry with respect to the central region of the plate 21, wherein compared to the bore groups 18.1 and 18.3 the through-bores 17 have a negative inclination angle, so that the melt supplied to the inlet side of the perforated plate 13 is transferred on the discharge side to the central region of the plate 21. This results in redistribution and uniformity of the melt on the discharge side of the perforated plate 13.

In the embodiments of the perforated plates 13 with through-bores 17 shown in FIGS. 1 to 9, it has been demonstrated that inclination angles of a maximum of 60° could achieve an adequate redistribution and uniformity of the melt. To this end, the embodiment shown in FIGS. 7 to 9 indicates that the inclination angle can be designed in an angular range of between 0° and 60°.

Figure 10:
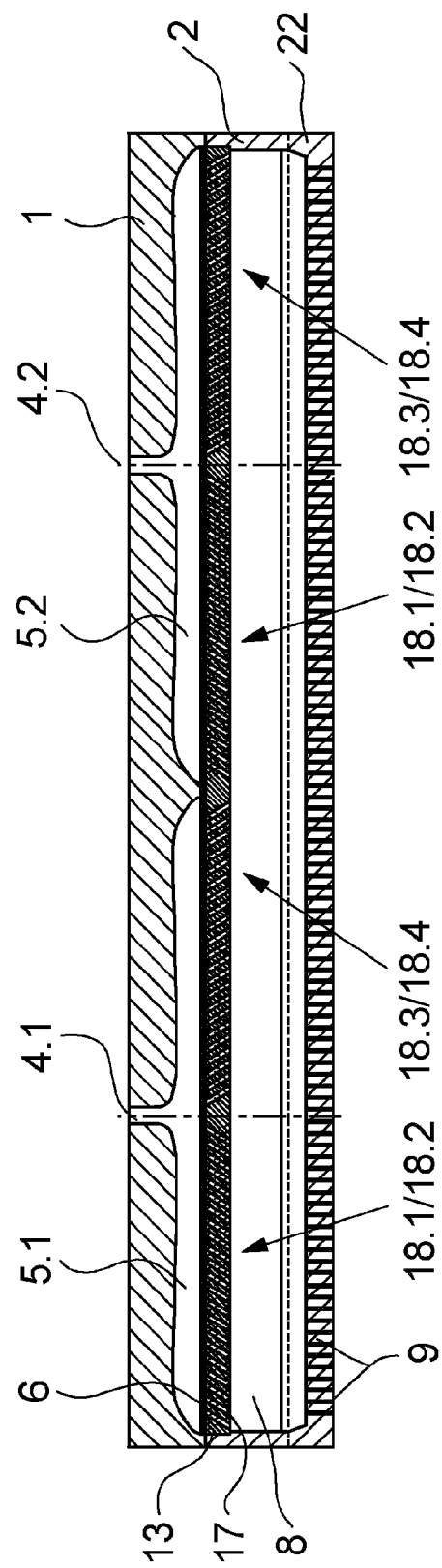
FIG. 10 shows schematically a longitudinal sectional view of another embodiment of the spinning nozzle of the present invention.

FIG. 10 shows a further embodiment of the spinneret bundle which can be used to produce fibers for larger production widths. FIG. 10 shows a longitudinal view of the spinneret bundle. Since the spinneret bundle has basically the same structural design as the above-mentioned embodiment according to FIGS. 1 and 2, it is only required to describe the differences.

In the embodiment represented in FIG. 10, the nozzle plate 2 and the diffuser plate (not shown) have the same design as the above-mentioned embodiment. Over the length of the nozzle package, the distributing plate 1 arranged on the upper face of the diffuser plate 2 comprises two adjacent distributing chambers 5.1 and 5.2, each of which has two discharging melt inlets 4.1 and 4.2. The distributing chambers 5.1 and 5.2 extend in a longitudinal direction toward the lower face of the distributing plate 1 and form a melt outlet open into a feed channel 8 in the nozzle plate 2. A filter element 6 and a perforated plate 13 have been provided between the distributing chambers 5.1 and 5.2 and the feed channel 8. For each distributing chamber 5.1 and 5.2, the perforated plate 13 comprises four bore groups of through bores 17, respectively. The bore groups of the through bores 17 associated with the distributing chambers 5.1 and 5.2 are designed in accordance with the embodiment of the perforated plate shown in FIG. 7. In this case, the symmetrical axis is not defined by the central region of the plate but by the respective melt inlet 4.1 and 4.2, so that a melt distribution occurs in each distributing chamber, according to the description provided in FIGS. 7 to 9.

The embodiment shown in FIG. 10 also provides the possibility of associating each distributing chamber 5.1 and 5.2 with a separate perforated plate, so that the perforated plates described in the above-mentioned embodiment according to FIGS. 1 to 6 could also be used for each distributing chamber.

Figure 11:
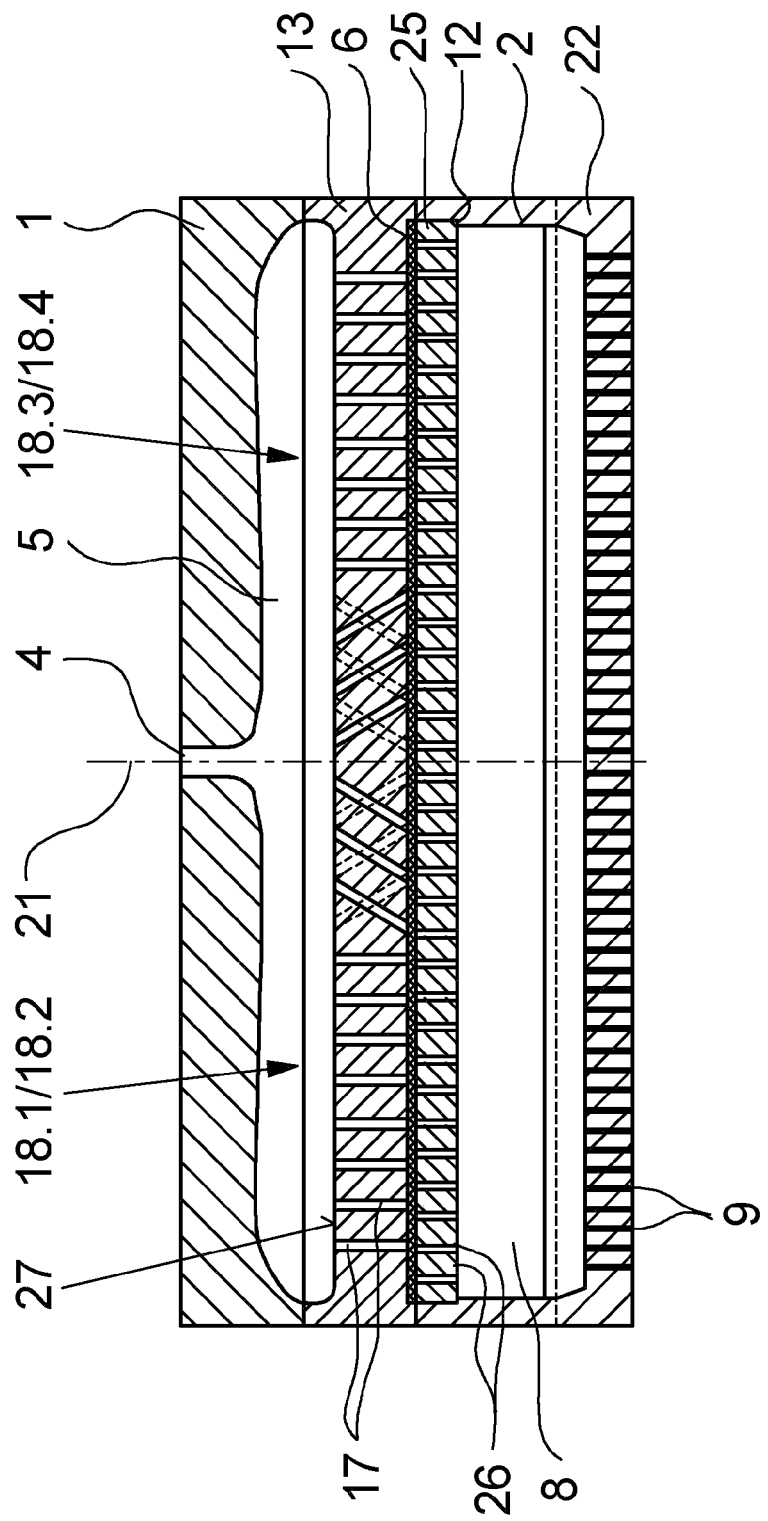
FIGS. 11 and 12 schematically show further embodiments of the invention-based spinneret bundle.

FIG. 11 shows a further schematic longitudinal view of an embodiment of the spinneret bundle for producing fibers from a polymer melt. Basically, the embodiment represented in FIG. 11 has the same design as the embodiment shown in FIG. 2 so that it is only required to describe the differences and otherwise refer to the above-mentioned description.

In the embodiment of the spinneret bundle shown in FIG. 11, the perforated plate is arranged in sandwich fashion between the distributing plate 1 and the nozzle plate 2. In this respect, the distributing plate 1 and the nozzle plate 2 comprise a distributing chamber 5, which is provided in the distributing plate 1. The distributing chamber 5 is extended by a distribution groove 27, which is provided on the upper face of the perforated plate 13. As a result, the through-bores 17 formed in the perforated plate 13 are supplied out of the distribution groove 27 with a polymer melt provided via the melt inlet 4 of the distributing plate 1.

In this arrangement, a filter element 6 has been arranged on the discharge side of the perforated plate 13. The filter element 6 is supported by a support plate 25. For this purpose, the support plate 25 has been arranged in a recess 12 of the nozzle plate 2. The nozzle plate 2 has the same design as the embodiment shown in FIGS. 1 and 2 and interacts on the lower face with a diffuser plate (not shown).

For the distribution of the polymer melt, the perforated plate comprises multiple bore groups which, corresponding to the embodiment shown in FIG. 7, are arranged in two rows of holes (not shown). The bore groups 18.1 and 18.2 are designed in mirror symmetry to the bore groups 18.3 and 18.4. In this respect, the plane of symmetry is formed by a central region 21 of the perforated plate 13. The through-bores 17 of the bore groups 18.1, 18.2, 18.3 and 18.4 are designed in such a way that only the through-bores 17 in a central portion of the nozzle, which in this case is identical with the central region of the plate 21, has an inclination to the intersecting distribution of the melt. In relation to the entire length of the distributing chamber 5, the central portion with the inclined through-bores 17 in the perforated plate 13 extends approximately to a length of one third of the distributing chamber. In the other regions of the distributing chamber, the through-bores 17 run perpendicular in the bore groups 18.1 to 18.4. It has been demonstrated that irregularities in melt viscosity occur especially in the central region of the distributing chamber 4 when feeding the melt directly from the distributing chamber 4 into the through-bores 17 of the perforated plate 13. Uniformity can be achieved when redistribution takes place via the inclined through-bores 17 of the bore groups 18.1 to 18.4.

Figure 12:
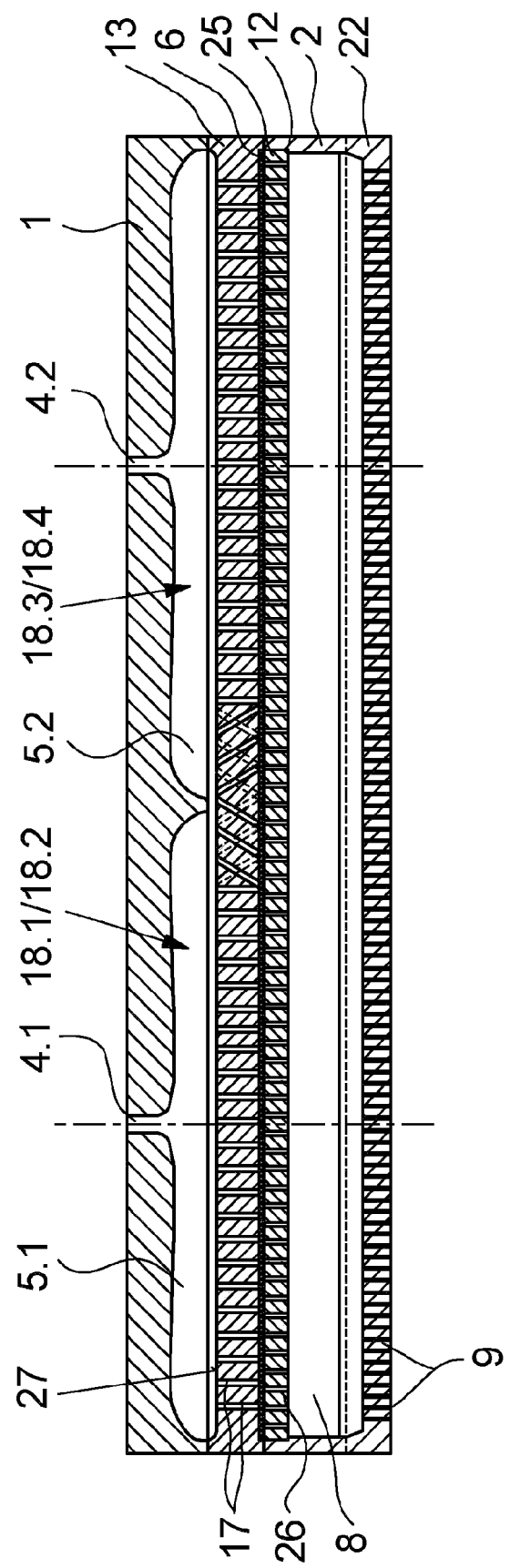

FIG. 12 shows a further embodiment of the spinneret bundle, wherein the embodiment is basically identical with the embodiment shown in FIG. 11. The embodiment represented in FIG. 12 shows a longitudinal representation of the spinneret bundle, which is especially useful for producing nonwovens for large working widths. Therefore, the distributing plate 1 comprises a plurality of adjacent distributing chambers 5.1 and 5.2, each of which is supplied with a polymer melt via a separate melt inlet 4.1 and 4.2.

The perforated plate 13 and the nozzle plate 2, which are combined with the distributing plate 1 have the same design as the embodiment shown in FIG. 11. Also in this case, the filter element 6 has been arranged in a downstream flow direction of the perforated plate 13 and is held in a recess of the nozzle plate 2 by means of a separate support plate 25. Said nozzle plate 2 has the same design as the embodiment shown in FIGS. 1 and 2 so that reference can be made to the above-mentioned description without providing any further explanations.

The nozzle plate 2 interacts with an exterior plate 3 (not shown).

The through-bores 17 provided in the perforated plate 13 have also been provided in multiple bore groups 18.1 to 18.4, which are arranged next to one another in two rows of holes (not shown). To achieve a redistribution of the melt in the central region of the spinneret bundle, in which the distributing chambers 5.1 and 5.2 border each other, the through-bores 17 in the perforated plate 13 are provided with an inclination in each of the bore groups 18.1 to 18.4. In this respect, the melt is redistributed only at the point of separation between the distributing chambers 5.1 and 5.2. In the other regions of the distributing chambers 5.1 and 5.2, the bore groups 18.1 to 18.4 are provided with perpendicular through-bores 17.

The invention-based spinneret bundle is especially suitable for producing temperature-sensitive polymers, such as the PBT polymer, with a high degree of uniformity with regard to fibers and fiber layers. The redistribution of the melt during the transfer from the distributing chamber to the feed channel results in high homogeneity of the melt, the viscosity differences of the melt resulting from different heat exchange behaviors in the distributing chamber are compensated in an advantageous manner.

REFERENCE LIST 1 distributing plate
2 nozzle plate
3 diffuser plate
4, 4.1, 4.2 melt inlet
5, 5.1, 5.2 distributing chamber
6 filter element
7.1, 7.2 air passage
8 feed channel
9 nozzle bores
10 lower face
11 upper face
12 Recess
13 perforated plate
14.1, 14.2 air passage
15.1, 15.2 air chamber
16.1, 16.2 air nozzle channel
17 through-bore
18.1, 18.2, 18.3, 18.4 bore groups
19.1, 19.2 row of holes
20.1, 20.2 distribution level
21 central region of the plate
22 Web
23 Recess
24.1, 24.2 compressed air inlet
25 support plate
26 Perforation
27 distribution groove

What is claimed is:

1. A spinneret bundle for producing fibers from a polymer melt comprising:
   a. an elongated nozzle plate that has a feed channel on an upper face and at least one row of nozzle bores that are arranged next to one another on a lower face, wherein the nozzle bores are fluidly connected with the feed channel and with a distributing plate provided on the upper face of the nozzle plate,
   b. at least one distributing chamber facing the feed channel and having a melt inlet connected with the distributing chamber; and,
   c. a perforated plate with a plurality of through-bores arranged between the distributing chamber of the distributing plate and the feed channel of the nozzle plate, wherein the through-bores in the perforated plate are divided into multiple bore groups such that the through-bores of at least two of the bore groups within the perforated plate have inclination angles ($\alpha$, $\beta$) that are different with respect to perpendicular bisectors in such a way that the through-bores of the bore groups at least partly cross one another at a distance from one another within the perforated plate and end in the same feed channel.

2. The spinneret bundle according to claim 1, wherein the through-bores within the perforated plate are formed by two adjacent rows of holes that run parallel to the at least one row of nozzle bores.

3. The spinneret bundle according to claim 1, wherein the through-bores within the perforated plate are arranged at two adjacent distribution levels, which extend parallel to the at least one row of nozzle bores.

4. The spinneret bundle according to claim 1, further comprising two rows of holes with multiple bore groups in the perforated plate, wherein the through-holes of the bore groups within one of the rows of holes are designed in mirror-symmetry to a central region of the perforated plate.

5. The spinneret bundle according to claim 1, wherein each of the through-bores of one of the bore groups within the perforated plate is provided with an equal inclination angle ($\alpha$, $\beta$).

6. The spinneret bundle according to claim 1, wherein each of the through-bores of one of the bore groups within the perforated plate is provided with a different inclination angle ($\alpha$, $\beta$).

7. The spinneret bundle according to claim 1, wherein the inclination angle ($\alpha$, $\beta$) of the through-bores are arranged in an angular range of between 0° to 60° and/or 0° to −60°.

8. The spinneret bundle according to claim 1, wherein in the distributing plate comprises a plurality of adjacent distributing chambers associated with one or multiple perforated plates with multiple bore groups.

9. The spinneret bundle according to claim 1, wherein the perforated plate is held in a recess that is arranged symmetrically with respect to the feed channel on the upper face of the nozzle plate.

10. The spinneret bundle according to claim 1, further comprising a diffuser plate arranged on the lower face of the nozzle plate and two opposite air nozzle channels provided between the nozzle plate and the diffuser plate, wherein the air nozzle channels have discharge outlets associated with the nozzle bores.

11. The spinneret bundle according to claim 1, wherein the through bores of at least two of the bore groups within the perforated plate are inclined in a longitudinal direction of the perforated plate.

12. The spinneret bundle according to claim 1, wherein the through bores of at least two of the bore groups within the perforated plate have inclination angles ($\alpha$, $\beta$) in a longitudinal direction of the feed channel that are different with respect to the perpendicular bisectors.

13. The spinneret bundle according to claim 1, wherein the through bores of at least two of the bore groups within the perforated plate are designed in mirror-symmetry with respect to a central cross-section region of the perforated plate.

14. The spinneret bundle according to claim 1, wherein each of the through-bores of one of the bore groups within the perforated plate is provided with a different inclination angle ($\alpha$, $\beta$) in a longitudinal direction of the perforated plate.

* * * * *